US012322157B2

(12) United States Patent
Li et al.

(10) Patent No.: US 12,322,157 B2
(45) Date of Patent: Jun. 3, 2025

(54) IMAGE CLASSIFICATION METHOD AND APPARATUS, DEVICE, STORAGE MEDIUM, AND PROGRAM PRODUCT

(71) Applicant: TENCENT TECHNOLOGY (SHENZHEN) COMPANY LIMITED, Guangdong (CN)

(72) Inventors: Yuexiang Li, Shenzhen (CN); Nanjun He, Shenzhen (CN); Kai Ma, Shenzhen (CN); Yefeng Zheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 365 days.

(21) Appl. No.: 18/072,337

(22) Filed: Nov. 30, 2022

(65) Prior Publication Data

US 2023/0092619 A1 Mar. 23, 2023

Related U.S. Application Data

(63) Continuation of application No. PCT/CN2022/093376, filed on May 17, 2022.

(30) Foreign Application Priority Data

Jun. 29, 2021 (CN) .......................... 202110723873.5

(51) Int. Cl.
   *G06V 10/764* (2022.01)
   *G06V 10/774* (2022.01)
(52) U.S. Cl.
   CPC .......... *G06V 10/764* (2022.01); *G06V 10/774* (2022.01)
(58) Field of Classification Search
   CPC .... G06V 20/10; G06V 10/243; G06F 16/951; G06N 3/08
   See application file for complete search history.

(56) References Cited

U.S. PATENT DOCUMENTS

| 7,245,315 B2 * | 7/2007 | Sadok | G08B 17/125 |
| | | | 348/165 |
| 7,747,082 B2 * | 6/2010 | Bressan | H04N 19/527 |
| | | | 382/232 |

(Continued)

FOREIGN PATENT DOCUMENTS

| CN | 109948671 A | 6/2019 |
| CN | 111126481 A | 5/2020 |

(Continued)

OTHER PUBLICATIONS

Translation of the International Search Report issued Jul. 13, 2022 in International Application No. PCT/CN2022/093376.

(Continued)

*Primary Examiner* — Yosef Kassa
(74) *Attorney, Agent, or Firm* — Sughrue Mion, PLLC

(57) ABSTRACT

An image classification method includes: performing image segmentation on an unlabeled sample image to obtain image blocks and performing feature extraction on each image block to obtain an initial image feature set including an initial image feature corresponding to each image block, rearranging and combining initial image features in the initial image feature set to obtain a first image feature set and a second image feature set, first image features in the first image feature set and second image features in the second image feature set corresponding to different rearrangement and combination manners, pre-training an image classification model based on the first image feature set and the second image feature set, the image classification model being configured to classify content in an image, and fine-tuning the pre-trained image classification model based on a labeled sample image.

20 Claims, 7 Drawing Sheets

(56) References Cited

U.S. PATENT DOCUMENTS

| | | | | |
|---|---|---|---|---|
| 8,548,828 | B1* | 10/2013 | Longmire | G16H 40/67 |
| | | | | 706/45 |
| 8,768,104 | B2* | 7/2014 | Moses | G06T 7/33 |
| | | | | 382/284 |
| 9,002,092 | B2* | 4/2015 | Madabhushi | G06T 7/0012 |
| | | | | 382/128 |
| 9,639,780 | B2* | 5/2017 | Ranzato | G06F 18/214 |
| 9,947,090 | B2* | 4/2018 | Agam | G06V 10/774 |

FOREIGN PATENT DOCUMENTS

| | | |
|---|---|---|
| CN | 111242217 A | 6/2020 |
| CN | 113177616 A | 7/2021 |

OTHER PUBLICATIONS

Translation of the Written Opinion issued Jul. 13, 2022 in International Application No. PCT/CN2022/093376.

Extended European Search Report issued Apr. 30, 2024 in European Application No. 22831494.4.

Kaiming He, et al., "Momentum Contrast for Unsupervised Visual Representation Learning", arXiv:1911.05722v3 [cs.CV], Mar. 23, 2020 (12 pages total).

Hari Sowrirajan, et al., "MoCo-CXR: MoCo Pretraining Improves Representation and Transferability of Chest X-ray Models", arXiv:2010.05352v3 [cs.CV], May 17, 2021, pp. 1-17 (17 pages total).

Written Opinion for PCT/CN2022/093376, dated Jul. 13, 2022.

International Search Report for PCT/CN2022/093376, dated Jul. 13, 2022.

* cited by examiner

IMAGE CLASSIFICATION METHOD AND APPARATUS, DEVICE, STORAGE MEDIUM, AND PROGRAM PRODUCT

CROSS-REFERENCE TO RELATED APPLICATIONS

This application is a continuation application of International Application No. PCT/CN2022/093376 filed on May 17, 2022, which claims priority to Chinese Patent Application No. 202110723873.5, filed with the China National Intellectual Property Administration on Jun. 29, 2021, the disclosures of each of which being incorporated by reference herein in their entireties.

FIELD

The disclosure relate to the field of artificial intelligence, and in particular, to an image classification method and apparatus, a device, a storage medium, and a program product.

BACKGROUND

Image classification refers to a process of distinguishing between different categories of images according to semantic information of the images.

In the related technology, inputted images are classified by using a vision transformer (ViT) model. During a training process of the model, a large quantity of labeled sample images is inputted, and then the model is trained based on a difference between a classification result predicted by the model and a label, so as to achieve precise classification of the images by the ViT model.

However, during the training process, if the labeled sample image is less, the ViT model has a poor training effect, which affects the accuracy of image classification.

SUMMARY

According to various embodiments, an image classification method, performed by a computer device, may include performing image segmentation on an unlabeled sample image to obtain image blocks and performing feature extraction on each image block to obtain an initial image feature set including an initial image feature corresponding to each image block; rearranging and combining the initial image features in the initial image feature set to obtain a first image feature set and a second image feature set, first image features in the first image feature set and second image features in the second image feature set corresponding to different rearrangement and combination manners; pre-training an image classification model based on the first image feature set and the second image feature set, the image classification model being configured to classify content in an image; and fine-tuning the pre-trained image classification model based on a labeled sample image.

According to various embodiments, an image classification apparatus, a computer device, a non-transitory computer-readable storage medium, a computer program product or a computer program, and a computer program product or a computer program consistent with the foregoing method may also be provided.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DETAILED DESCRIPTION

Figure 1:
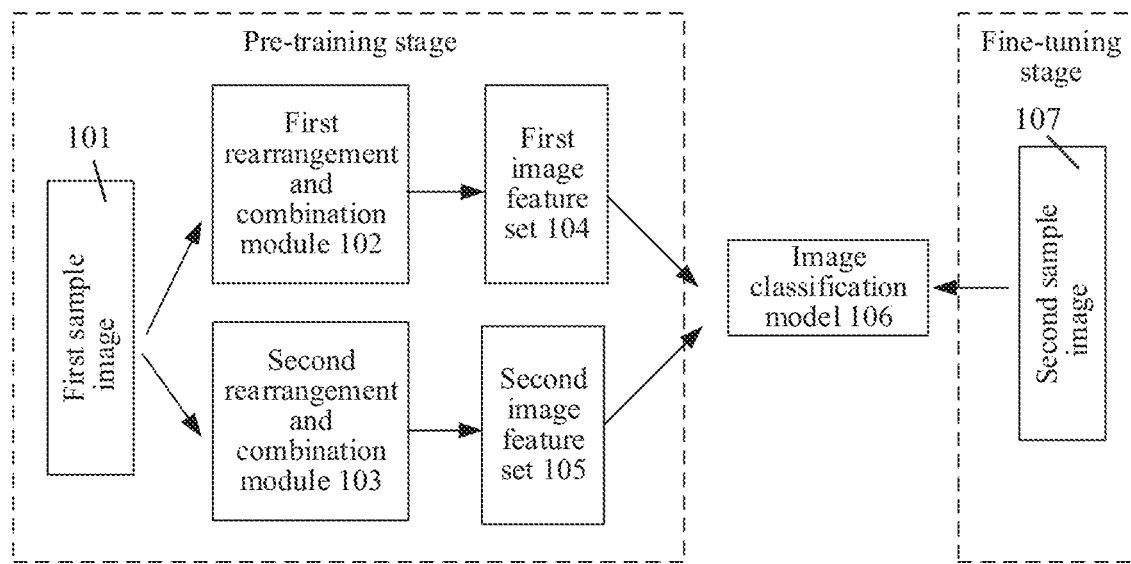
FIG. 1 shows a schematic diagram of a principle of training an image classification model according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

Some embodiments may provide an image classification method and apparatus, a device, a non-transitory computer-readable storage medium, and a program product, which can reduce the need for labeled sample images during a training process of an image classification model, and help to improve the accuracy of a prediction result of the image classification model.

In some embodiments, an order of the initial image features is disturbed in different manners and is rearranged and recombined to obtain the first image feature set and the second image feature set, and then self-supervision pre-training may be performed on the image classification model based on the image feature sets under different rearrangement and combination manners. The pre-training is performed without the use of labeled sample images, which reduces the amount of need for the labeled sample images, and reduces the amount of manual labeling tasks. After the pre-training, the pre-trained image classification model is fine-tuned through the labeled sample images, to ensure the classification performance of the finally obtained image classification model, which helps to improve the accuracy of image classification.

In the following descriptions, related "some embodiments" describe a subset of all possible embodiments. However, it may be understood that the "some embodiments" may be the same subset or different subsets of all the possible embodiments, and may be combined with each other without conflict.

Artificial intelligence (AI) is a theory, method, technology, and application system that uses a digital computer or a machine controlled by the digital computer to simulate, extend, and expand human intelligence, perceive an environment, acquire knowledge, and use knowledge to obtain an optimal result. In other words, AI is a comprehensive technology in computer science and attempts to understand the essence of intelligence and produce a new intelligent machine that can react in a manner similar to human intelligence. AI is to study design principles and implementation methods of various intelligent machines, to enable the machines to have functions of perception, reasoning, and decision-making.

An AI technology is a comprehensive discipline, and relates to a wide range of fields including both hardware-level technologies and software-level technologies. Basic AI technologies generally include technologies such as a sensor, a dedicated AI chip, cloud computing, distributed storage, a big data processing technology, an operating/interaction system, and electromechanical integration. AI software technologies mainly include several major directions such as a computer vision technology, a speech processing technology, a natural language processing technology, and machine learning/deep learning.

A computer vision (CV) technology is a science that studies how to use a machine to "see", and furthermore, refers to using a camera and a computer to replace human eyes to perform machine vision such as recognition, tracking, and measurement on a target, and further perform graphic processing, so that the computer processes the target into an image more suitable for human eyes to observe, or an image transmitted to an instrument for detection. As a scientific discipline, CV studies related theories and technologies, and attempts to establish an AI system that can obtain information from images or multidimensional data. The CV technologies generally include technologies such as image processing, image recognition, image segmentation, image semantic understanding, image retrieval, video processing, video semantic understanding, video content/behavior recognition, three-dimensional object reconstruction, a 3D technology, virtual reality, augmented reality, synchronous positioning, and map construction, and further include biometric feature recognition technologies such as common face recognition and fingerprint recognition. An image classification method involved in some embodiments, that is, an application of the CV technology in the field of image recognition, can reduce the need for labeled sample images during a training process of an image classification model, and help to improve the accuracy of a prediction result of the trained image classification model.

FIG. 1 shows a schematic diagram of a principle of training an image classification model according to some embodiments. A model pre-training system includes a first rearrangement and combination module 102 and a second rearrangement and combination module 103. A first sample image 101 that does not carry a sample label is inputted into the first rearrangement and combination module 102 and the second rearrangement and combination module 103, respectively, to obtain a first image feature set 104 and a second image feature set 105. Then, an image classification model 106 is pre-trained based on the first image feature set 104 and the second image feature set 105. After the pre-training is completed, a second sample image 107 carrying the sample label is inputted into the pre-trained image classification model 106, and parameters are fine-tuned, so as to obtain a final image classification model for image classification.

Figure 2:
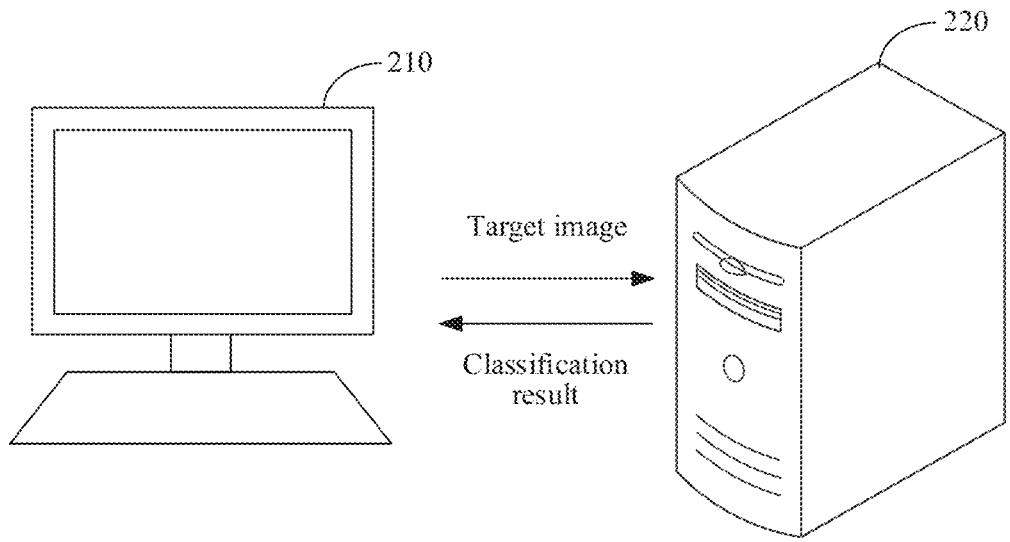
FIG. 2 shows a schematic diagram of an implementation environment according to some embodiments.

FIG. 2 shows a schematic diagram of an implementation environment according to some embodiments. The implementation environment includes a computer device 210 and a server 220. The computer device 210 and the server 220 perform data communication with each other through a communication network. In some embodiments, the communication network may be a wired network or a wireless network, and the communication network may be at least one of a local area network, a metropolitan area network, and a wide area network.

The computer device 210 is an electronic device having image classification needs, and the electronic device may be a smartphone, a tablet computer, a personal computer, or the like, which is not limited herein. In some embodiments, an application having an image classification function is run in the computer device 210. The application may be a social application, an image retrieval application, or an image storage application. When it is necessary to classify a target image set (such as medical images, animal images, or people images), or to identify a category of a single target image, the computer device 210 may input the target image set or the target image into the application, thereby uploading the target image set or the target image to the server 220 for identification of the image category and feedback of classification results.

The server 220 may be an independent physical server, a server cluster or a distributed system formed by a plurality of physical servers, or a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform.

In some embodiments, the server 220 is configured to provide an image classification service for the application installed in the computer device 210. In some embodiments, an image classification model is disposed in the server 220. The image classification model is an image classification model that has been pre-trained through an unlabeled first sample image and fine-tuned through a labeled second sample image, and is configured to classify images sent by the computer device 210.

In some embodiments, the image classification model may also be deployed on the side of the computer device 210, and the computer device 210 implements image classification locally without the use of the server 220. Correspondingly, the image classification model is trained on the side of the computer device 210. In some embodiments, the image classification model is trained on the side of the server 220, and the trained image classification model is deployed in the computer device 210. This is not limited herein. For ease of presentation, the following embodiments are described by using an example in which the image classification method is performed by the computer device.

In some embodiments, the server deployed with a neural network model (image classification model) may be a node in a distributed system, where the distributed system may be a blockchain system, and the blockchain system may be a distributed system formed by connecting a plurality of nodes through network communication. The nodes may form a peer to peer (P2P) network. Computing devices in any form, for example, electronic devices such as a server and a terminal, may join the P2P network to become a node in the blockchain system. The node includes a hardware layer, an intermediate layer, an operating system layer, and an application layer. During a model training process, training samples of the image classification model may be saved on the blockchain.

Figure 3:
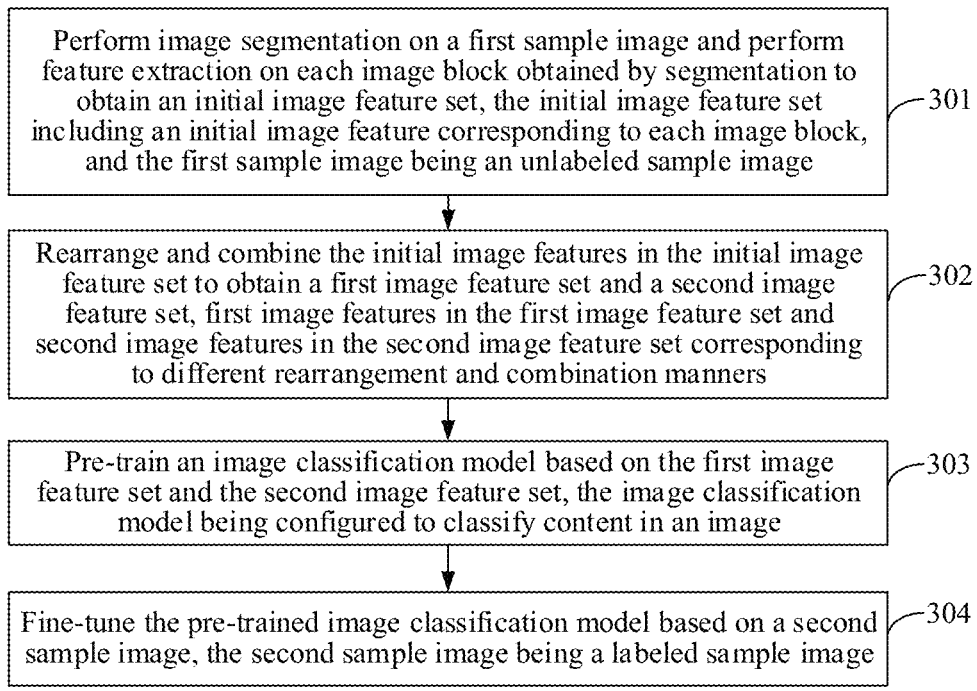
FIG. 3 shows a flowchart of an image classification method according to some embodiments.

FIG. 3 shows a flowchart of an image classification method according to some embodiments. In some embodiments, description is made by using an example in which the method is performed by the computer device. The method includes the following operations.

Operation 301: Perform image segmentation on a first sample image and perform feature extraction on each image block obtained by segmentation to obtain an initial image feature set, the initial image feature set including an initial image feature corresponding to each image block, and the first sample image being an unlabeled sample image.

In some embodiments, the image classification model may be applied to any scenario that identifies a category to which image content belongs, and thus, the first sample image may be an image of any category, such as a medical image, an animal image, or a landscape image. The first sample image is an image set of unlabeled sample images.

In some embodiments, after obtaining the first sample image, the computer device first performs image segmentation on the image. In some embodiments, the first sample image may be segmented into image blocks of the same size, and different image blocks carry different image information.

After the segmentation is completed, the computer device performs feature extraction on each image block obtained by segmentation. In some embodiments, the computer device performs linear mapping on each image block to obtain the initial image feature corresponding to each image block, and the initial image features are combined into the initial image feature set.

Operation 302: Rearrange and combine the initial image features in the initial image feature set to obtain a first image feature set and a second image feature set, first image features in the first image feature set and second image features in the second image feature set corresponding to different rearrangement and combination manners.

In some embodiments, after obtaining the initial image feature set, the computer device rearranges and combines the initial image features in the initial image feature set in different manners to obtain the first image feature set and the second image feature set.

In some embodiments, each first image feature included in the first image feature set and each second image feature included in the second image feature set indicate different image information. That is, the computer device obtains different combination manners of image features in the first sample image through different rearrangement and combination manners.

After the rearrangement and combination, a quantity of the obtained first image features is the same as a quantity of the initial image features in the initial image feature set, and correspondingly, a quantity of the second image features is the same as the quantity of the initial image features.

Operation 303: Pre-train an image classification model based on the first image feature set and the second image feature set, the image classification model being configured to classify content in an image.

The pre-training refers to a process in which the image classification model is trained by using a large dataset so that the image classification model learns common features in the dataset. A purpose of the pre-training is to provide high-quality model parameters for subsequent training of the image classification model on a particular dataset.

Since the first image feature in the first image feature set and the second image feature in the second image feature set are image features at different positions of the first sample image, although the features are different, the first image feature and the second image feature belong to image features of the same image, and image classification results corresponding to the two are consistent. Therefore, after inputting each first image feature and each second image feature into the image classification model, the computer device may implement self-supervision training of the image classification model according to the obtained classification result based on the principle that the prediction results of the model are consistent, and thus it is not necessary to use the labeled sample images, that is, sample images with labels.

The image classification model is configured to classify the content in the image. In some embodiments, the image classification model may identify a category of a single image or distinguish categories of images in an image set to complete the classification of the image set.

Operation 304: Fine-tune the pre-trained image classification model based on a second sample image, the second sample image being a labeled sample image.

Fine-tuning is a process of making small-scale precise adjustments to the model parameters through a small quantity of datasets, and a supervision-type learning manner is adopted in a fine-tuning stage. Therefore, the pre-trained image classification model is fine-tuned by using the labeled second sample image.

Since the model obtained by pre-training already has high-quality model parameters, the fine-tuning stage may only require a small quantity of labeled samples to make the model have high performance on a target task. A data quantity of the data set used for fine-tuning may be less than a data quantity of the data set used for pre-training. Therefore, a quantity of the second sample image is less than a quantity of the first sample image, which may reduce the need for the labeled sample images.

In summary, in some embodiments, an order of the initial image features is disturbed in different manners and is rearranged and recombined to obtain the first image feature set and the second image feature set, and then self-supervision pre-training may be performed on the image classification model based on the image feature sets under different rearrangement and combination manners. The pre-training is performed without the use of labeled sample images, which reduces the amount of need for the labeled sample images, and reduces the amount of manual labeling tasks. After the pre-training, the pre-trained image classification model is fine-tuned through the labeled sample images, to ensure the classification performance of the finally obtained image classification model, which helps to improve the accuracy of image classification.

In order to implement a process of self-supervision pre-training, in some embodiments, an online learning branch and a target learning branch are respectively used to classify image feature sets obtained by different rearrangements and combinations, and then a pre-training process of the image classification model is implemented based on classification results of the two branches. Hereinafter, description is made according to some embodiments.

Figure 4:
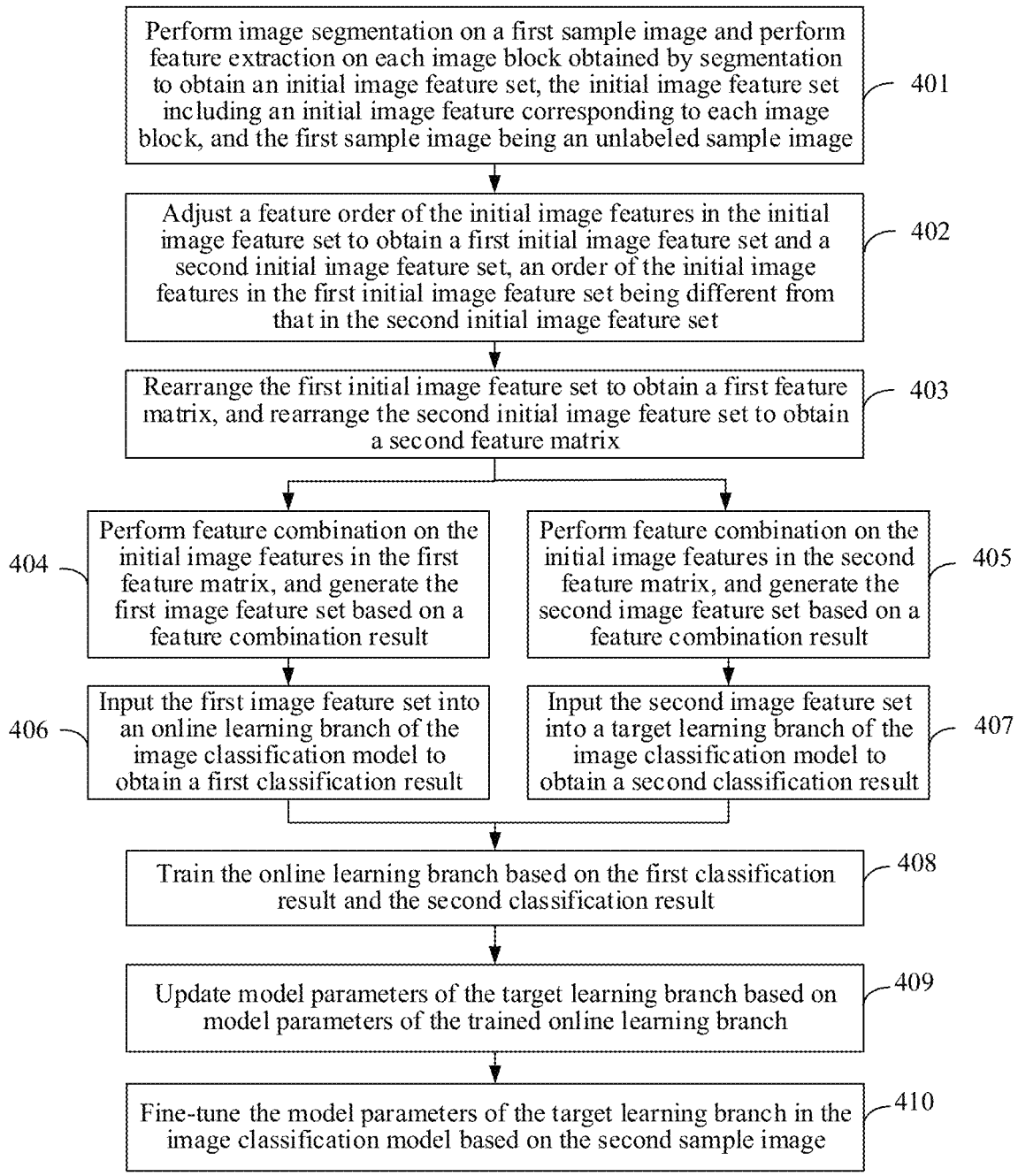
FIG. 4 shows a flowchart of an image classification method according to some embodiments.

FIG. 4 shows a flowchart of an image classification method according to some embodiments. In some embodiments, description is made by using an example in which the method is performed by the computer device. The method includes the following operations.

Operation 401: Perform image segmentation on a first sample image and perform feature extraction on each image block obtained by segmentation to obtain an initial image feature set, the initial image feature set including an initial image feature corresponding to each image block, and the first sample image being an unlabeled sample image.

In some embodiments, the image classification model in some embodiments may be a ViT model, and the ViT model is an image classification model obtained by combining CV and natural language processing (NLP) fields.

When using the ViT model to classify the first sample image, the computer device first segments the first sample image into image blocks having a fixed size, and then transforms each image block into the initial image feature through linear transformation, that is, each image block is encoded into a token, and the token is provided with order information.

Figure 5:
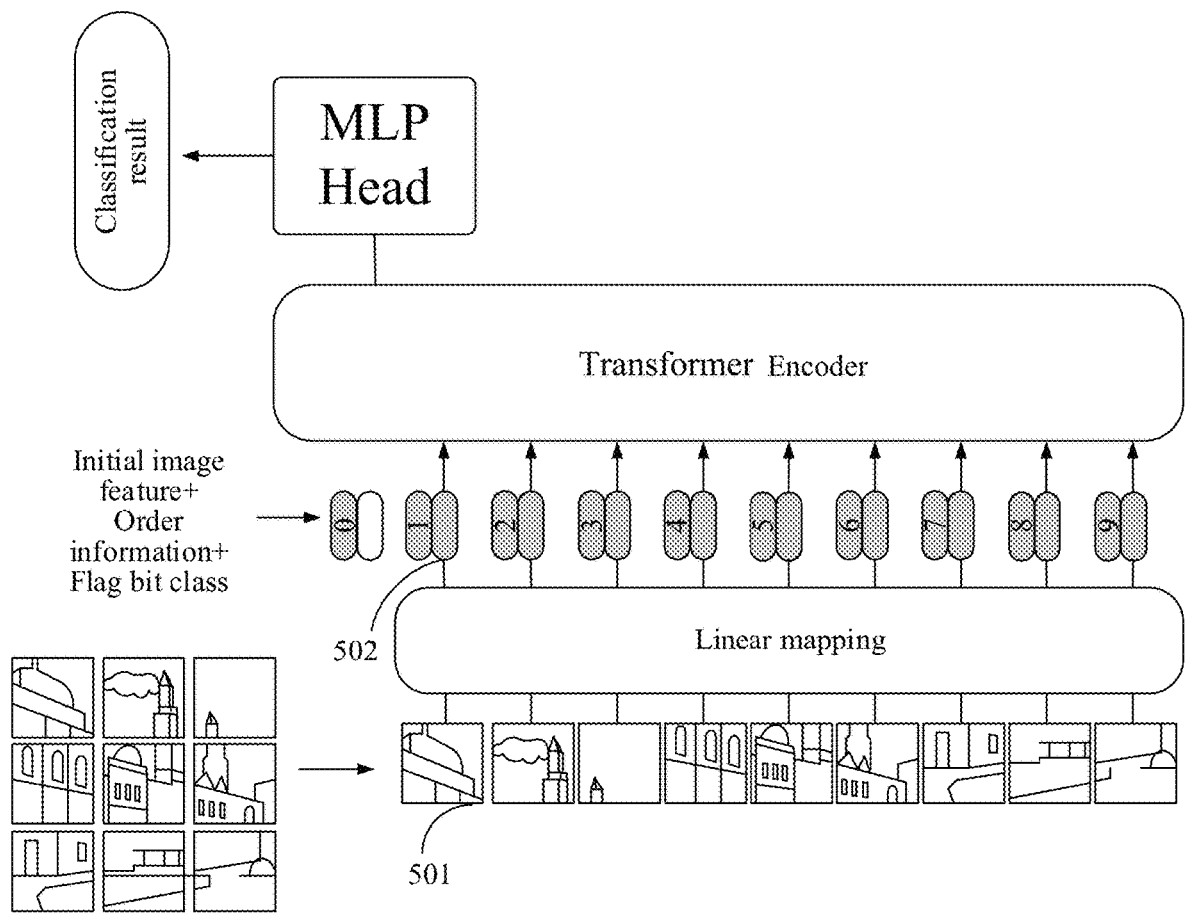
FIG. 5 shows a schematic structural diagram of a ViT model according to some embodiments.

As shown in FIG. 5, first, the first sample image is segmented into image blocks 501, and then each image block is linearly transformed to obtain tokens 502 corresponding to each image block, thereby obtaining the initial image feature set.

Operation 402: Adjust a feature order of the initial image features in the initial image feature set to obtain a first initial image feature set and a second initial image feature set, an order of the initial image features in the first initial image feature set being different from that in the second initial image feature set.

When the initial image features are rearranged and combined, the order of the initial image features is first adjusted, that is, position information of each initial image feature is disturbed.

In some embodiments, the computer device randomly disturbs an arrangement order of the initial image features to obtain the first initial image feature set and the second initial image feature set. In some embodiments, the computer device may change the arrangement order of the initial image features in two fixed order adjustment manners to obtain the first initial image feature set and the second initial image feature set. This is not limited herein.

In some embodiments, during randomly disturbing, the order of each initial image feature may be adjusted, which is adjusted to be different from an initial order. In some embodiments, partial initial image features are selected, and only a feature order of the partial initial image features is adjusted.

In some embodiments, since the first image feature set and the second image feature set are obtained by performing different rearrangements and combinations on the initial image features, when randomly disturbing the initial image features, different disturbing manners are adopted to obtain the first initial image feature set and the second initial image feature set, so that the order of the initial image features is different, that is, the first image feature set and the second image feature set may be different. Subsequent feature recombination may be performed in the same or different manners.

Figure 6:
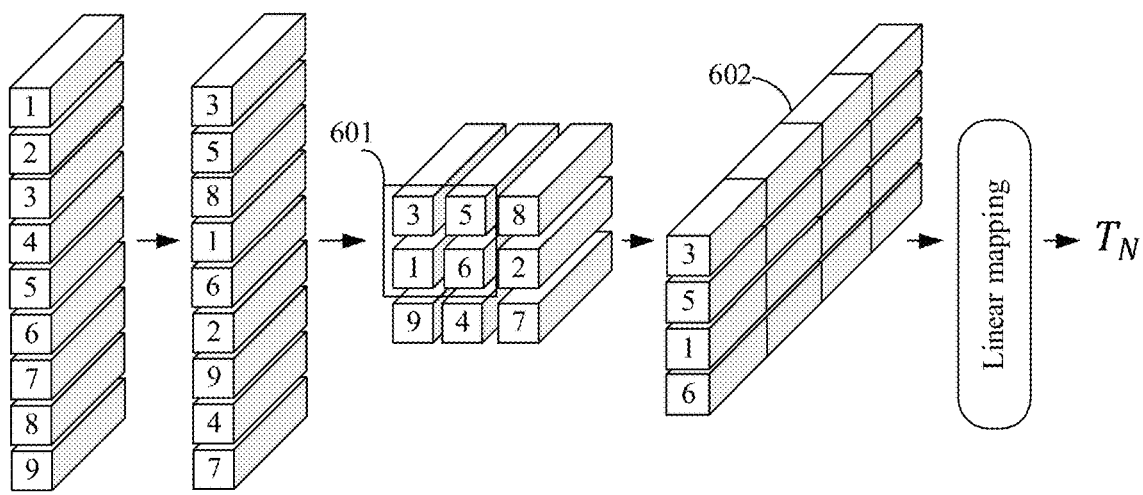
FIG. 6 is a schematic diagram of implementation of a rearrangement and combination process according to some embodiments.

In some embodiments, as shown in FIG. 6, an initial image feature set T∈{$t_1$, ..., $t_9$} includes 9 initial image features, that is, 9 tokens, with corresponding order information. First, each token is randomly disturbed to obtain a first initial image feature set $T_{p1}$={$t_3$, $t_5$, $t_8$, $t_1$, $t_6$, $t_2$, $t_9$, $t_4$, $t_7$}.

Another random disturbing manner is adopted for each token to obtain a second initial image feature set, such as $T_{p2}$={$t_2$, $t_7$, $t_3$, $t_1$, $t_4$, $t_9$, $t_9$, $t_5$, $t_6$}.

Operation 403: Rearrange the first initial image feature set to obtain a first feature matrix, and rearrange the second initial image feature set to obtain a second feature matrix.

After the initial image features are disturbed, the disturbed initial image feature set may be rearranged. In some embodiments, a feature matrix for the disturbed initial image feature set may be constructed first, including constructing the first feature matrix of the first initial image feature set and the second feature matrix of the second initial image feature set. That constructing the first feature matrix and the second feature matrix may include the following operations.

Operation 403a: Determine a matrix size based on an image segmentation manner of the first sample image.

In some embodiments, when constructing the matrix, the size of the constructed matrix may be determined according to the image segmentation manner of the first sample image, to avoid that the size of the constructed matrix does not match a quantity of image blocks obtained by segmentation. If 9 image blocks are obtained by segmenting the first sample image, a 3×3 matrix may be constructed; if 16 image blocks are obtained by segmenting the first sample image, a 4×4 matrix or a 2×8 matrix may be constructed.

In some embodiments, as shown in FIG. 5, after segmenting the first sample image, 9 image blocks are obtained. Therefore, when constructing the matrix, the matrix size may be determined as 3×3, which matches the quantity of image blocks obtained by segmentation.

Operation 403b: Rearrange the initial image features in the first initial image feature set based on the matrix size to obtain the first feature matrix.

After the computer device determines the matrix size, the first feature matrix is constructed according to the matrix size, that is, the initial image features in the first initial image feature set are rearranged.

In some embodiments, the initial image features may be selected in sequence according to the order of the initial image features in the first initial image feature set, and then arranged in rows or arranged in columns, to construct the first feature matrix.

Combined with the above example, the matrix size is 3×3, then the initial image features in the first initial image feature set $T_{p1}$={$t_3$, $t_5$, $t_8$, $t_1$, $t_6$, $t_2$, $t_9$, $t_4$, $t_7$} are selected in sequence to construct a 3×3 matrix, that is, starting from $t_3$, 3 tokens are selected in sequence as the first row of the matrix, by analogy, the matrix is constructed. As shown in FIG. 6, the first feature matrix is:

$$\begin{bmatrix} t_3 & t_5 & t_8 \\ t_1 & t_6 & t_2 \\ t_9 & t_4 & t_7 \end{bmatrix}$$

Operation 403c: Rearrange the initial image features in the second initial image feature set based on the matrix size to obtain the second feature matrix.

Correspondingly, the computer device also constructs the second feature matrix according to the matrix size, that is, rearranges the initial image features in the second initial image feature set. In some embodiments, the manner for constructing the second feature matrix may be the same as or different from that for the first feature matrix, which is not limited herein. For example, the first feature matrix is constructed by row arrangement, the second feature matrix is constructed by column arrangement; or, the first feature matrix is constructed by column arrangement, and the second feature matrix is constructed by row arrangement; or both the first feature matrix and the second feature matrix are constructed by row arrangement.

Combined with the above example, the second initial image feature set $T_{p2}=\{t_2, t_7, t_3, t_1, t_4, t_9, t_8, t_5, t_6\}$ is rearranged to construct a 3×3 matrix by column, to obtain the second feature matrix as follows:

$$\begin{bmatrix} t_2 & t_1 & t_8 \\ t_7 & t_4 & t_5 \\ t_3 & t_9 & t_6 \end{bmatrix}$$

This operation and the above operation 403b, that is, the operation of constructing the first feature matrix, may be performed synchronously or asynchronously. Some embodiments describe only the manners for constructing the first feature matrix and the second feature matrix, but does not limit execution timing.

Operation 404: Perform feature combination on the initial image features in the first feature matrix, and generate the first image feature set based on a feature combination result.

After the rearrangement ends, the computer device performs feature combination on the initial image features in the first feature matrix, and generates the first image feature set according to the combination result. Image information in the image block corresponding to each first image feature in the first image feature set changes, that is, is different from image information in the image block corresponding to each initial image feature.

In some embodiments, a process of performing feature combination and generating the first image feature set based on the combination result may include the following operations.

Operation 404a: Select n adjacent initial image features in the first feature matrix through a sliding window.

In some embodiments, the computer device uses a sliding window sampling manner to select n initial image features for feature combination every time, where a size of the sliding window needs to be smaller than the matrix size. For example, a 2×2 sliding window may be used for the 3×3 matrix, and a 2×2 sliding window or a 3×3 sliding window may be used for the 4×4 matrix.

In some embodiments, a 3×3 first feature matrix may be sampled by using a 2×2 sliding window. As shown in FIG. 6, 4 initial image features may be selected through a sliding window 601.

Operation 404b: Perform feature combination on the n initial image features to obtain a first combined image feature.

In some embodiments, feature combination is performed on the n initial image features in the sliding window to obtain the first combined image feature after combination.

In some embodiments, a feature combination manner may include feature splicing, feature fusion, and the like, that is, performing feature splicing on the n initial image features to obtain the first combined image feature, or performing feature fusion, that is, feature addition on the n initial image features to obtain the first combined image feature.

In some embodiments, as shown in FIG. 6, the computer device performs feature splicing on 4 initial image features $t_3$, $t_5$, $t_1$, and $t_6$ to obtain a first combined image feature 602.

Operation 404c: Perform linear mapping on m groups of the first combined image features to obtain the first image feature set, the m groups of the first combined image features being obtained by moving the sliding window.

In some embodiments, the computer device traverses the first feature matrix by sliding the sliding window to obtain the m groups of the first combined image features, where m is a positive integer. A sliding step size and a sliding direction of the sliding window may be set randomly or fixedly. For example, the sliding step size may be set to 1, and the sliding window may slide according to a row direction.

After obtaining the m groups of the first combined image features, the computer device performs linear mapping on the m groups of the first combined image features to obtain the first image feature set. In some embodiments, the m groups of the first combined image features may be outputted to a multilayer perceptron (MLP) for linear mapping to obtain the first image feature set. A quantity of the first image features in the first image feature set obtained by mapping is the same as the quantity of the initial image features.

As shown in FIG. 6, the sliding step size is set to 1, and the sliding window first slides in the row direction. After the combination of one row of image features is completed, the sliding window is moved in a column direction to combine the next row of image features, so as to obtain a combination of 4 groups of initial image features, each group including 4 initial image features. The computer device performs feature combination on the 4 initial image features included in each group to obtain 4 groups of first combined image features, namely $T_L=\{t_1', t_2', t_3', t_4'\}$, where $t_1'$ is a first combined image feature obtained by splicing $t_3$, $t_5$, $t_1$, and $t_6$, $t_2'$ is a first combined image feature obtained by splicing $t_5$, $t_8$, $t_6$, and $t_2$, $t_3'$ is a first combined image feature obtained by splicing $t_1$, $t_6$, $t_9$, and $t_4$, and $t_4'$ is a first combined image feature obtained by splicing $t_6$, $t_2$, $t_4$, and $t_7$. $T_L=\{t_1', t_2', t_3', t_4'\}$ is linearly mapped to obtain a first image feature set $T_N=\{\hat{t}_1; \ldots, \hat{t}_9\}$.

Operation 405: Perform feature combination on the initial image features in the second feature matrix, and generate the second image feature set based on a feature combination result.

Correspondingly, after the rearrangement ends, the computer device performs feature combination on the initial image features in the second feature matrix, and generates the second image feature set according to the combination result. Image information in the image block corresponding to each second image feature in the second image feature set changes, that is, is different from image information in the image block corresponding to each initial image feature, and different from the image information of the image block corresponding to the first image feature.

In some embodiments, that performing feature combination and generating the second image feature set based on the combination result may include the following operations.

Operation 405a: Select n adjacent initial image features in the second feature matrix through a sliding window.

In some embodiments, when constructing the second feature matrix, the computer device also uses a sliding window sampling manner to select n initial image features for feature combination, where a size of the sliding window needs to be smaller than the matrix size.

A size of the sliding window for sampling the second feature matrix may be the same as or different from a size of the sliding window for sampling the first feature matrix. For example, a 2×2 sliding window may be used for sampling a 4×4 first feature matrix to obtain 4 groups of first combined image features that do not intersect with each other, and a 3×3 sliding window may be used for sampling a 4×4 second feature matrix to obtain 4 groups of second combined image features that intersect with each other.

Operation 405b: Perform feature combination on the n initial image features to obtain a second combined image feature.

In some embodiments, feature combination is performed on the n initial image features in the sliding window to obtain the second combined image feature after combination.

In some embodiments, a feature combination manner may include feature splicing, feature fusion, and the like, that is, performing feature splicing on the n initial image features to obtain the second combined image feature, or performing feature fusion, that is, feature addition on the n initial image features to obtain the second combined image feature.

Operation 405c: Perform linear mapping on m groups of the second combined image features to obtain the second image feature set, the m groups of the second combined image features being obtained by moving the sliding window.

Similarly, the computer device traverses the second feature matrix by sliding the sliding window to obtain the m groups of the second combined image features. A sliding step size and a sliding direction of the sliding window may be set randomly. For example, the sliding step size may be set to 1, and the sliding window may slide according to the column direction.

After obtaining the m groups of the second combined image features, the computer device performs linear mapping on the m groups of the second combined image features to obtain the second image feature set. In some embodiments, the m groups of the second combined image features may be outputted to a MLP for linear mapping to obtain the second image feature set. A quantity of the second image features in the second image feature set obtained by mapping is the same as the quantity of the initial image features.

Operation 406: Input the first image feature set into an online learning branch of the image classification model to obtain a first classification result.

In some embodiments, after obtaining the first image feature set and the second image feature set, the computer device may pre-train the image classification model by using the first image feature set and the second image feature set.

In some embodiments, the image classification model includes an online learning branch and a target learning branch, where the online learning branch and the target learning branch have the same structures of the image classification model, which are structures corresponding to the ViT model, but the corresponding model parameters are updated in different manners.

In some embodiments, the computer device inputs the first image feature set into the online learning branch of the image classification model, and the online learning branch is used for identifying an image category of the first sample image according to the image features indicated by the first image feature set, to obtain the first classification result. As shown in FIG. 5, the ViT model inputs the first image feature set into a Transformer encoder, performs image feature extraction on the first image feature set, and inputs extraction results into a classifier MLP Head for image classification, to obtain the first classification result.

Figure 7:
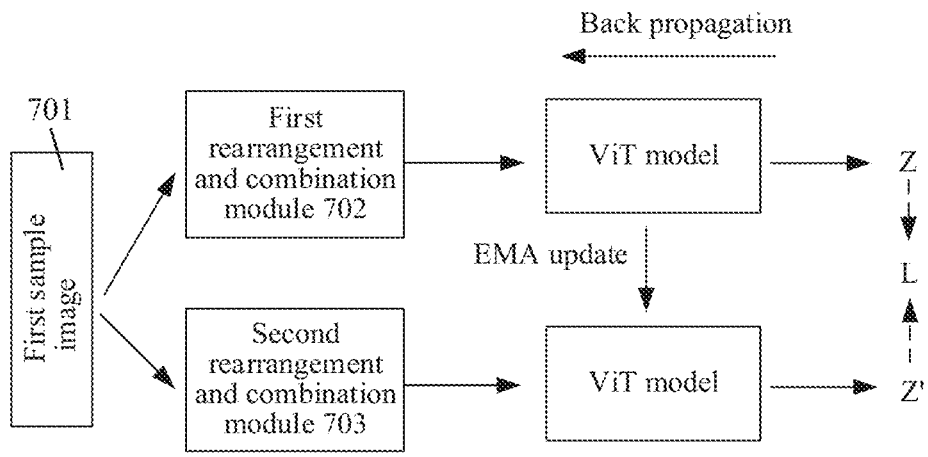
FIG. 7 shows a schematic diagram of implementation of pre-training of an image classification model according to some embodiments.

In some embodiments, as shown in FIG. 7, a first sample image 701 is inputted into a first rearrangement and combination module 702 to obtain the first image feature set, and the first image feature set is inputted into the ViT model to obtain a first classification result Z, this branch being the online learning branch.

Operation 407: Input the second image feature set into a target learning branch of the image classification model to obtain a second classification result.

In some embodiments, the second image feature set is inputted into the target learning branch, and the target learning branch is used for identifying an image category of the second sample image according to the image features indicated by the second image feature set, that is, to obtain the second classification result. Similar to the manner for obtaining the first classification result, the second image feature set is inputted into the encoder, image feature extraction is performed on the second image feature set, and extraction results are also inputted into the classifier MLP Head for image classification, to obtain the second classification result.

In some embodiments, as shown in FIG. 7, the first sample image 701 is inputted into a second rearrangement and combination module 703 to obtain the second image feature set, and the second image feature set is inputted into the ViT model to obtain a second classification result Z', this branch being the target learning branch. The second rearrangement and combination module 703 and the first rearrangement and combination module 702 respectively correspond to different rearrangement and combination manners.

Operation 408: Train the online learning branch based on the first classification result and the second classification result.

Since the first image feature in the first image feature set and the second image feature in the second image feature set are different from each other, in order to enable the image classification model to accurately classify the same first sample image feature under different combination manners, in some embodiments, the computer device first trains the online learning branch based on the first classification result and the second classification result, and then updates model parameters of the target learning branch based on the updated online learning branch. A training process of the online learning branch may include the following operations.

Operation 408a: Determine a similarity loss between the first classification result and the second classification result.

In order to make the image classification model to identify consistent results of the image features under different combination arrangement manners, the computer device determines the similarity loss between the first classification result and the second classification result, and then trains the ViT model based on the similarity loss, so that the ViT model can obtain the same classification result according to the image features under different combination arrangement manners, thereby improving the accuracy of the ViT model for image classification. The update of the model parameters of the ViT model may also be implemented without the use of labeled sample images, thereby implementing self-supervision learning of the ViT model.

In some embodiments, the similarity loss refers to the degree of consistency between the first classification result and the second classification result, and the similarity loss between the first classification result and the second classification result may be determined by using a L1 loss function, a L2 loss function, or the like. For example, the similarity loss may be:

$$L=\|Z-Z'\|_2^2$$

Where L represents the similarity loss, Z represents the first classification result, and Z' represents the second classification result.

Operation 408b: Update the model parameters of the online learning branch by back propagation based on the similarity loss.

In some embodiments, a manner for updating the model parameters in the online learning branch is different from a manner for updating the model parameters in the target learning branch. The online learning branch is updated by using a back propagation manner, while the model parameters in the target learning branch are updated according to the model parameters in the online learning branch. Furthermore, the model parameters of the image classification model in the online learning branch and the target learning branch are optimized through iterative training, that is, the model parameters of the ViT model are optimized.

In some embodiments, after the similarity loss is determined, the model parameters of the online learning branch may be updated based on the similarity loss by back propagation until the model parameters meet training conditions, that is, until the similarity loss meets convergence conditions.

Operation 409: Update model parameters of the target learning branch based on model parameters of the trained online learning branch.

In some embodiments, every time the model parameters of the online learning branch are updated, the computer device will update the model parameters of the target learning branch accordingly. Ultimately, when the model parameters in the online learning branch meet the training conditions, the model parameters of the target learning branch will be updated again. In this case, both the online learning branch and the target learning branch stop updating the model parameters.

In some embodiments, based on the model parameters of the trained online learning branch, the model parameters of the target learning branch may be updated with exponential moving average (EMA). An update manner is as follows:

$$\xi = \tau\xi + (1-\tau)\theta$$

Where $\xi$ is the model parameter of the image classification model in the target learning branch, $\theta$ is the model parameter of the image classification model in the online learning branch, and $T$ is a weight parameter for balancing the two model parameters.

Operation 410: Fine-tune the model parameters of the target learning branch in the image classification model based on the second sample image.

In order to further improve the accuracy of identifying the image category by the image classification model, after the image classification model is pre-trained based on the unlabeled sample images, the model parameters of the image classification model are fine-tuned by using a small quantity of labeled second sample images.

In some embodiments, the model parameters of the target learning branch may be fine-tuned, and a fine-tuning process may include the following operations.

Operation 410a: Input the second sample image into the target learning branch of the image classification model to obtain a sample classification result.

Each labeled second sample image is inputted into the ViT model of the target learning branch to obtain the sample classification result corresponding to each second sample image.

Operation 410b: Fine-tune the model parameters of the target learning branch by back propagation based on the sample classification result and a sample classification label corresponding to the second sample image.

After the sample classification result is determined, the model parameters may be fine-tuned by back propagation according to the sample classification result and the pre-labeled sample classification label, to obtain a final image classification model. For example, a loss may be determined based on the sample classification result and the labeled sample classification label, and the model parameters may be fine-tuned inversely based on the loss to obtain optimized model parameters.

Finally, image classification is performed based on the ViT model using the optimized model parameters.

In some embodiments, by performing image classification on the first image feature set and the second image feature set under different rearrangement and combination manners, and pre-training the image classification model based on the obtained first classification result and second classification result, the accuracy of outputting the classification result may be improved when the image classification model performs classification prediction on different combination manners of the same sample image feature.

In some embodiments, different feature orders are obtained by adjustment, which makes the rearrangement and combination manners of the image features in the first image feature set and the second image feature set different. In some embodiments, the computer device may further obtain the first image feature set and the second image feature set by setting different feature rearrangement manners or feature combination manners.

Figure 8:
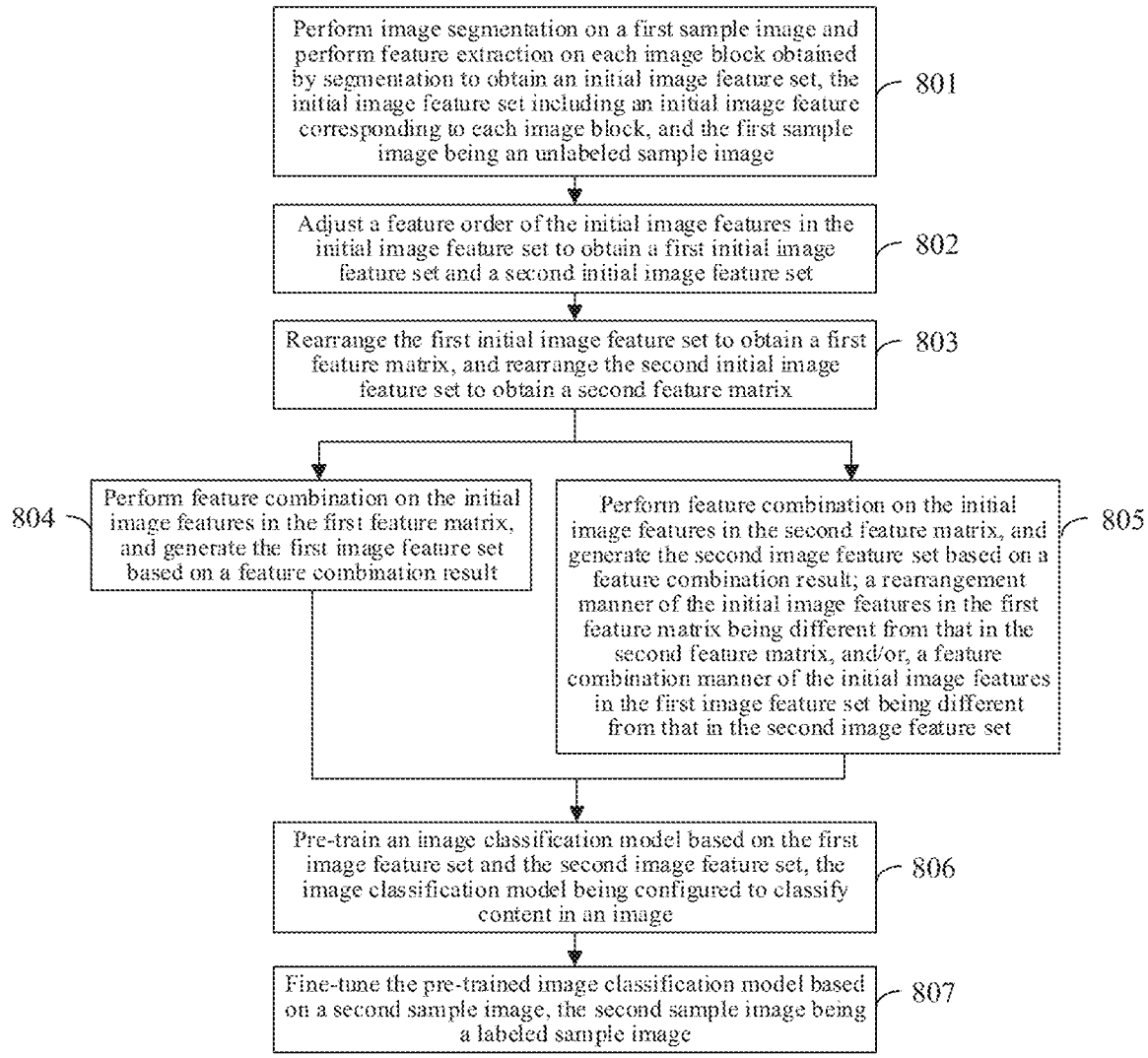
FIG. 8 shows a flowchart of an image classification method according to some embodiments.

FIG. 8 shows a flowchart of an image classification method according to some embodiments. In some embodiments, description is made by using an example in which the method is performed by the computer device. The method includes the following operations.

Operation 801: Perform image segmentation on a first sample image and perform feature extraction on each image block obtained by segmentation to obtain an initial image feature set, the initial image feature set including an initial image feature corresponding to each image block, and the first sample image being an unlabeled sample image.

For a specific implementation of operation 801, reference may be made to the above operation 401, and details are not described again herein.

Operation 802: Adjust a feature order of the initial image features in the initial image feature set to obtain a first initial image feature set and a second initial image feature set.

When the initial image features are rearranged and combined, the order of the initial image features is first adjusted, that is, position information of each initial image feature is disturbed.

In some embodiments, the computer device may adjust the feature order of the initial image features in the initial image feature set in the same manner to obtain the first initial image feature set and the second initial image feature set, or may adjust the feature order of the initial image features in the initial image feature set in different disturbing manners to obtain the first initial image feature set and the second initial image feature set. This is not limited herein.

Operation 803: Rearrange the first initial image feature set to obtain a first feature matrix, and rearrange the second initial image feature set to obtain a second feature matrix.

In some embodiments, the computer device may rearrange the first initial image feature set and the second initial image feature set in the same rearrangement manner, or may rearrange the first initial image feature set and the second initial image feature set in different rearrangement manners.

When the computer device rearranges the first initial image feature set and the second initial image feature set in the same rearrangement manner, it needs to ensure that feature combination manners corresponding to the first image feature set and the second image feature set are different in a subsequent feature combination process.

For a specific rearrangement process of the feature set, reference may be made to the above operation 403, and details are not described again herein.

Operation 804: Perform feature combination on the initial image features in the first feature matrix, and generate the first image feature set based on a feature combination result.

Operation 805: Perform feature combination on the initial image features in the second feature matrix, and generate the second image feature set based on a feature combination result. A rearrangement manner of the initial image features in the first feature matrix is different from that in the second feature matrix, and/or, a feature combination manner of the initial image features in the first image feature set is different from that in the second image feature set.

After the rearrangement ends, the computer device performs feature combination on the initial image features in the first feature matrix, and generates the first image feature set according to the combination result, and performs feature combination on the initial image features in the second feature matrix, and generates the second image feature set according to the combination result.

In some embodiments, if the computer device rearranges the first initial image feature set and the second initial image feature set in the same rearrangement manner, the feature combination manners of the initial image features in the first image feature set and the second image feature set need to be different, thereby ensuring that the image features corresponding to the first image feature set and the second image feature set are different.

Operation 806: Pre-train an image classification model based on the first image feature set and the second image feature set, the image classification model being configured to classify content in an image.

Operation 807: Fine-tune the pre-trained image classification model based on a second sample image, the second sample image being a labeled sample image.

Another manner for generating the first image feature set and the second image feature set is described herein. The specific model pre-training and the fine-tuning process may refer to the embodiment corresponding to FIG. 4, and details are not described again.

In some embodiments, if the robustness and accuracy of the image classification model need to be further improved, the complexity of the image features in the image feature set obtained after the rearrangement and combination may be improved through multiple rearrangements and combinations, and then the image classification model may be pre-trained through the complex image feature set. Hereinafter, description is made according to some embodiments.

Figure 9:
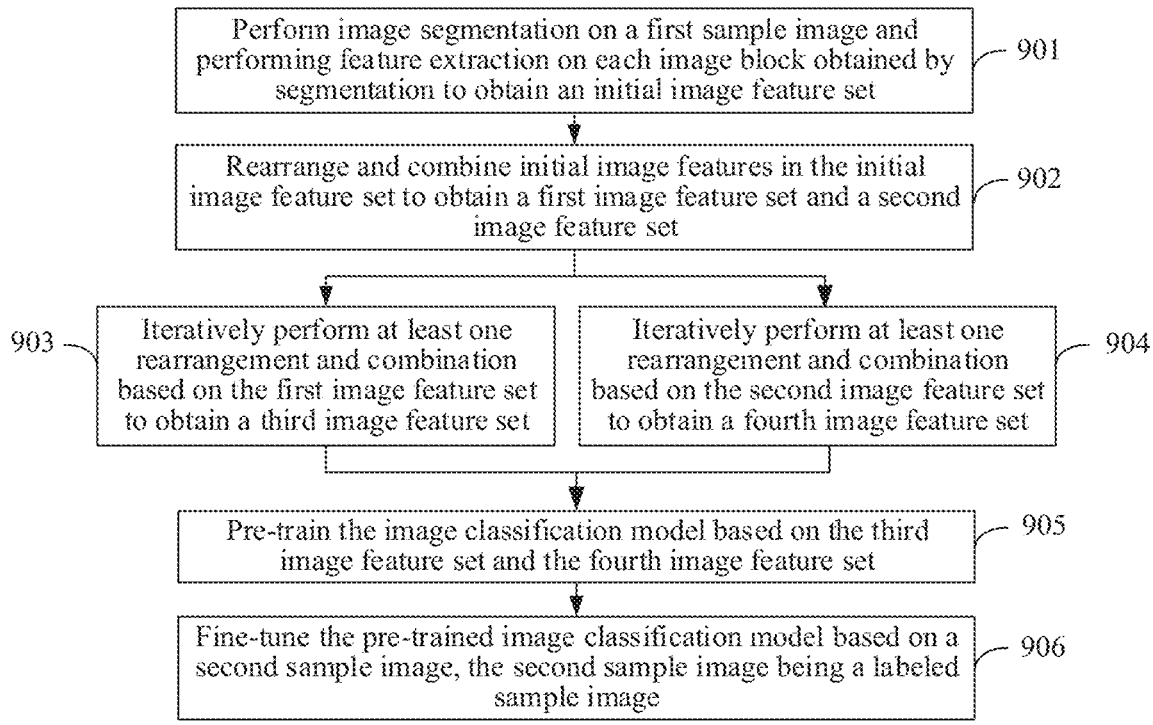
FIG. 9 shows a flowchart of an image classification method according to some embodiments.

FIG. 9 shows a flowchart of an image classification method according to some embodiments. In some embodiments, description is made by using an example in which the method is applied to a computer device. The method includes the following operations:

Operation 901: Perform image segmentation on a first sample image and performing feature extraction on each image block obtained by segmentation to obtain an initial image feature set.

Operation 902: Rearrange and combine initial image features in the initial image feature set to obtain a first image feature set and a second image feature set.

For the implementation of the operations 901 and 902, reference may be made to the above operations 401 to 405, and details are not described again herein.

Operation 903: Iteratively perform at least one rearrangement and combination based on the first image feature set to obtain a third image feature set.

In some embodiments, in order to further improve the robustness and accuracy of the image classification model, after the first image feature set is obtained, the first image features in the first image feature set continue to be rearranged and combined to obtain a new image feature set, and image features in the new image feature set continue to be rearranged and combined, that is, iteratively performing at least one rearrangement and combination, to obtain the third image feature set.

In some embodiments, a quantity of times of iterations may be set according to the needs for the classification performance of the image classification model, and the quantity of times of iterations is positively correlated with the classification performance of the image classification model.

A manner for iteratively performing rearrangement and combination may refer to the above manner for rearranging and combining the initial image features in the initial image feature set, that is, including a process of disrupting, rearranging, combining, and ultimately linearly mapping the first image features. In the process of iteratively performing the rearrangement and combination, the same rearrangement and combination manner or different rearrangement and combination manners may be adopted, which is not limited herein.

Operation 904: Iteratively perform at least one rearrangement and combination based on the second image feature set to obtain a fourth image feature set.

When the first image feature set is iteratively rearranged and combined at least once, the second image feature set may also be iteratively rearranged and combined at least once, to obtain the fourth image feature set. Similarly, the rearrangement and combination manner includes a process of disrupting, rearranging, combining, and ultimately linearly mapping the second image features. Also, the same rearrangement and combination manner or different rearrangement and combination manners may be adopted.

In some embodiments, a quantity of times of iterations for iteratively rearranging and combining the second image feature set may be the same as or different from a quantity of times of iterations for iteratively rearranging and combining the first image feature set. In some embodiments, it is also possible that at least one rearrangement and combination is iteratively performed based only on the first image feature set, or at least one rearrangement and combination is iteratively performed based only on the second image feature set.

Operation 905: Pre-train the image classification model based on the third image feature set and the fourth image feature set.

In some embodiments, the operation of pre-training the image classification model based on the third image feature set and the fourth image feature set may refer to the operation of pre-training the image classification model based on the first image feature set and the second image feature set in some embodiments, and details are not described again herein.

Operation 906: Fine-tune the pre-trained image classification model based on a second sample image, the second sample image being a labeled sample image.

For the implementation of this operation, reference may be made to the above operation 410, and details are not described again herein.

In some embodiments, after the initial image features are rearranged and combined to obtain the first image feature set and the second image feature set, the rearrangement and combination continue to be iteratively performed based on the first image feature set and the second image feature set to improve the complexity of the third image features in the finally obtained third image feature set and the fourth image features in the finally obtained fourth image feature set, and then the image classification model is pre-trained based on the third image feature set and the fourth image feature set, to improve the robustness of the image classification model.

In some embodiments, the robustness of the image classification model is improved by iteratively rearranging and combining the first image feature set and the second image feature set. In some embodiments, a learning branch of the image classification model may continue to be added, thereby pre-training the image classification model based on classification results of multi-branches. In some embodiments, the model parameters of the online learning branch may be updated by back propagation based on a similarity loss between two classification results.

Figure 10:
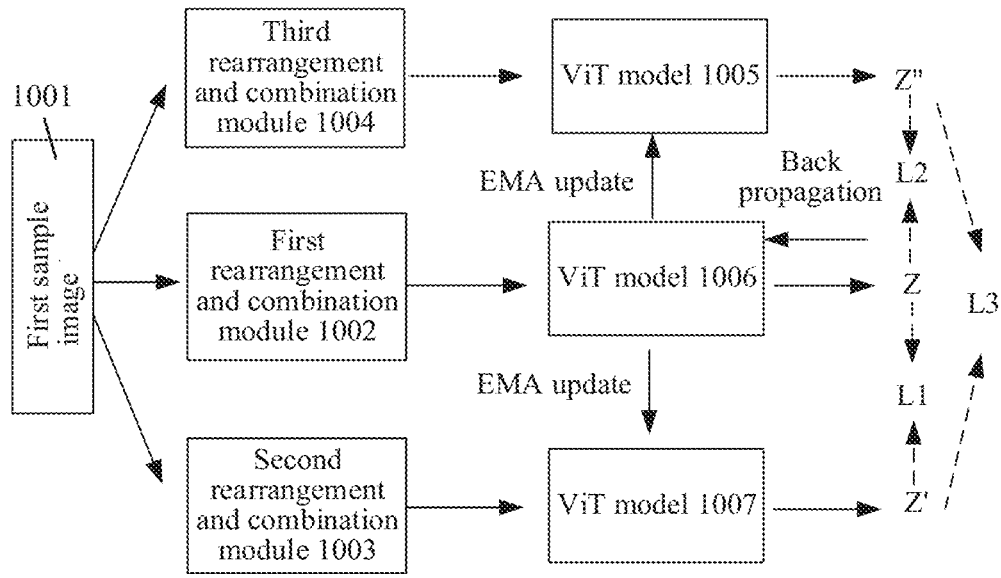
FIG. 10 shows a schematic diagram of implementation of pre-training of an image classification model according to some embodiments.

As shown in FIG. 10, a first sample image 1001 is inputted into a first rearrangement and combination module 1002, a second rearrangement and combination module 1003, and a third rearrangement and combination module 1004, respectively, to obtain image feature sets under different rearrangement and combination manners. The image feature sets are respectively inputted into the ViT model for image classification, to obtain a first classification result Z, a second classification result Z', and a third classification result Z". Then, a first similarity loss L1 may be determined based on the first classification result Z and the second classification result Z', a second similarity loss L2 may be determined based on the first classification result Z and the third classification result Z", and a third similarity loss L3 may be determined based on the second classification result Z' and the third classification result Z". Then, a total loss is determined based on the first similarity loss L1, the second similarity loss L2, and the third similarity loss L3. Model parameters of a ViT model 1005 are updated by back propagation, while model parameters of a ViT model 1006 and a ViT model 1007 are updated based on the model parameters of the ViT model 1005.

The robustness of the image classification model can be improved by respectively performing image classification on the image feature sets obtained under multiple rearrangement and combination manners and training the image classification model based on multiple classification results.

Figure 11:
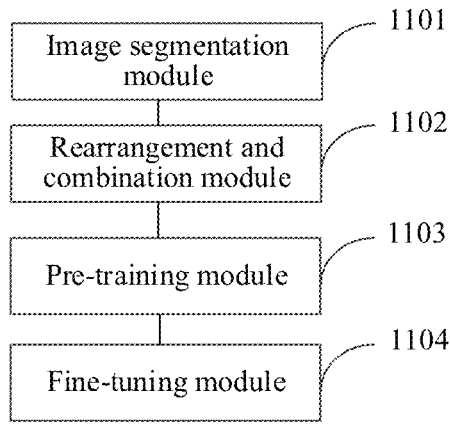
FIG. 11 is a structural block diagram of an image classification apparatus according to some embodiments.

FIG. 11 is a structural block diagram of an image classification apparatus according to some embodiments. As shown in FIG. 11, the apparatus includes the following modules:

an image segmentation module 1101, configured to perform image segmentation on a first sample image and perform feature extraction on each image block obtained by segmentation to obtain an initial image feature set, the initial image feature set including an initial image feature corresponding to each image block, and the first sample image being an unlabeled sample image;

a rearrangement and combination module 1102, configured to rearrange and combine the initial image features in the initial image feature set to obtain a first image feature set and a second image feature set, first image features in the first image feature set and second image features in the second image feature set corresponding to different rearrangement and combination manners;

a pre-training module 1103, configured to pre-train an image classification model based on the first image feature set and the second image feature set, the image classification model being configured to classify content in an image; and a fine-tuning module 1104, configured to fine-tune the pre-trained image classification model based on a second sample image, the second sample image being a labeled sample image.

In some embodiments, the rearrangement and combination module 1102 is further configured to:

adjust a feature order of the initial image features in the initial image feature set to obtain a first initial image feature set and a second initial image feature set, an order of the initial image features in the first initial image feature set being different from that in the second initial image feature set;

rearrange the first initial image feature set to obtain a first feature matrix, and rearrange the second initial image feature set to obtain a second feature matrix;

perform feature combination on the initial image features in the first feature matrix, and generate the first image feature set based on a feature combination result; and perform feature combination on the initial image features in the second feature matrix, and generate the second image feature set based on a feature combination result.

In some embodiments, the rearrangement and combination module 1102 is further configured to:

select n adjacent initial image features in the first feature matrix through a sliding window;

perform feature combination on the n initial image features to obtain a first combined image feature; and perform linear mapping on m groups of the first combined image features to obtain the first image feature set, the m groups of the first combined image features being obtained by moving the sliding window.

In some embodiments, the rearrangement and combination module 1102 is further configured to:

select n adjacent initial image features in the second feature matrix through a sliding window;

perform feature combination on the n initial image features to obtain a second combined image feature; and perform linear mapping on m groups of the second combined image features to obtain the second image feature set, the m groups of the second combined image features being obtained by moving the sliding window.

In some embodiments, the rearrangement and combination module 1102 is further configured to:

perform feature splicing on the n initial image features to obtain the first combined image feature, or perform feature fusion on the n initial image features to obtain the first combined image feature.

In some embodiments, the rearrangement and combination module 1102 is further configured to:

perform feature splicing on the n initial image features to obtain the second combined image feature, or perform feature fusion on the n initial image features to obtain the second combined image feature.

In some embodiments, the rearrangement and combination module 1102 is further configured to:

determine a matrix size based on an image segmentation manner of the first sample image;

rearrange the initial image features in the first initial image feature set based on the matrix size to obtain the first feature matrix; and rearrange the initial image features in the second initial image feature set based on the matrix size to obtain the second feature matrix.

In some embodiments, the rearrangement and combination module 1102 is further configured to:

iteratively perform at least one rearrangement and combination based on the first image feature set to obtain a third image feature set; and iteratively perform at least one rearrangement and combination based on the second image feature set to obtain a fourth image feature set.

The pre-training module 1103 is further configured to pre-train the image classification model based on the third image feature set and the fourth image feature set.

In some embodiments, the rearrangement and combination module 1102 is further configured to:

adjust a feature order of the initial image features in the initial image feature set to obtain a first initial image feature set and a second initial image feature set;

rearrange the first initial image feature set to obtain a first feature matrix, and rearrange the second initial image feature set to obtain a second feature matrix;

perform feature combination on the initial image features in the first feature matrix, and generate the first image feature set based on a feature combination result; and perform feature combination on the initial image features in the second feature matrix, and generate the second image feature set based on a feature combination result;

a rearrangement manner of the initial image features in the first feature matrix being different from that in the second feature matrix, and/or, a feature combination manner of the initial image features in the first image feature set being different from that in the second image feature set.

In some embodiments, the pre-training module 1103 is further configured to:

input the first image feature set into an online learning branch of the image classification model to obtain a first classification result;

input the second image feature set into a target learning branch of the image classification model to obtain a second classification result;

train the online learning branch based on the first classification result and the second classification result; and update model parameters of the target learning branch based on model parameters of the trained online learning branch.

In some embodiments, the pre-training module 1103 is further configured to:

determine a similarity loss between the first classification result and the second classification result; and update the model parameters of the online learning branch by back propagation based on the similarity loss.

In some embodiments, the pre-training module 1103 is further configured to:

perform EMA update on the model parameters of the target learning branch based on the model parameters of the trained online learning branch.

In some embodiments, the fine-tuning module 1104 is further configured to:

fine-tune the model parameters of the target learning branch in the image classification model based on the second sample image.

In some embodiments, the fine-tuning module 1104 is further configured to:

input the second sample image into the target learning branch of the image classification model to obtain a sample classification result; and fine-tune the model parameters of the target learning branch by back propagation based on the sample classification result and a sample classification label corresponding to the second sample image.

In some embodiments, the image classification model is a ViT model.

In summary, sin some embodiments, the image segmentation and feature extraction are performed on the sample image to obtain the initial image feature set, the initial image features in the initial image feature set are rearranged and combined in different manners to obtain the first image feature set and the second image feature set, and then the pre-training may be performed on the image classification model based on the image feature sets under different rearrangement and combination manners. The pre-training is performed without the use of labeled sample images, which reduces the amount of need for the labeled sample images. After the pre-training, the pre-trained image classification model is fine-tuned through the labeled sample images, to ensure the classification performance of the finally obtained image classification model, which helps to improve the accuracy of image classification.

Figure 12:
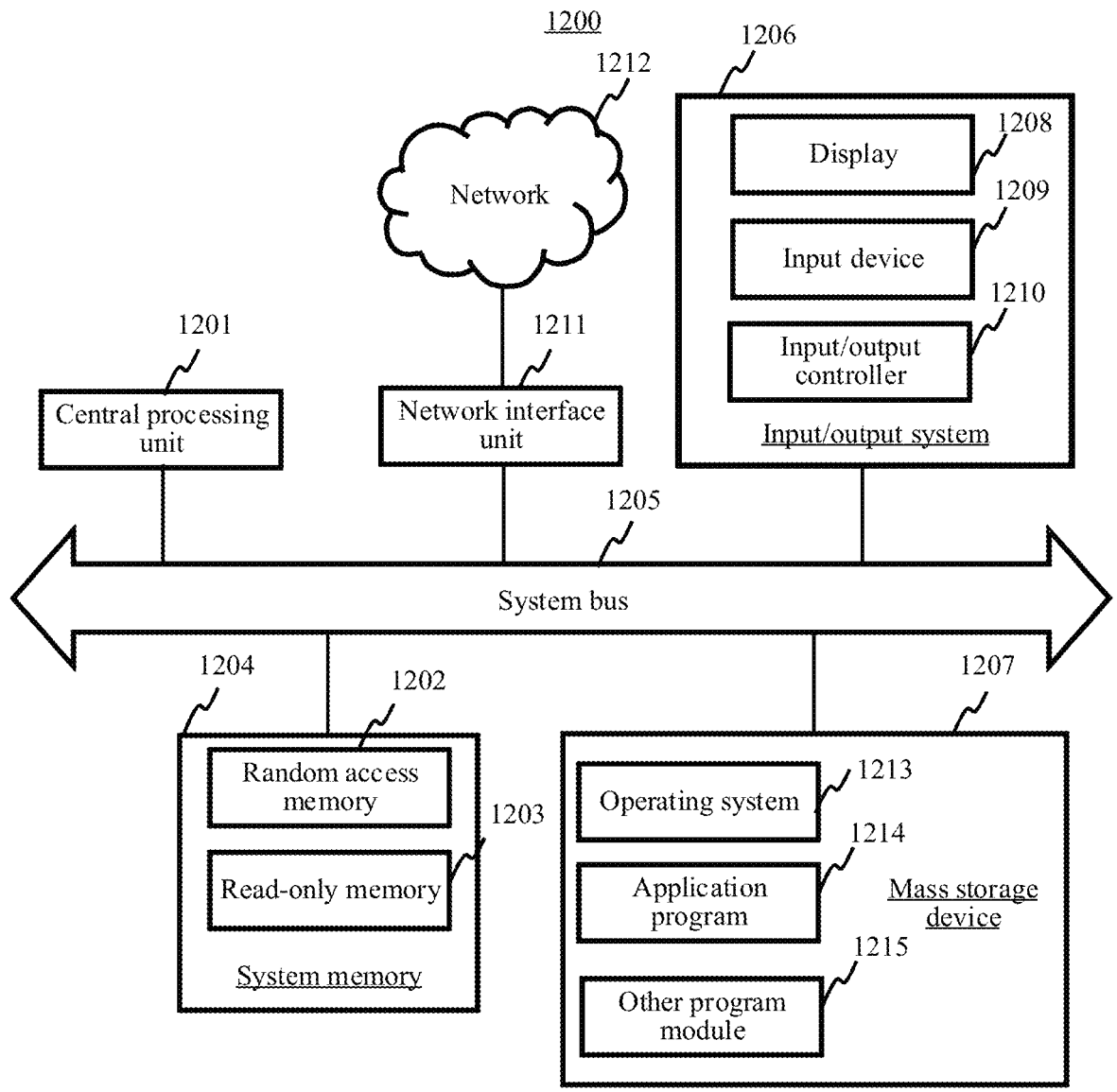
FIG. 12 shows a schematic structural diagram of a computer device according to some embodiments.

FIG. 12 is a schematic structural diagram of a computer device according to some embodiments. In some embodiments, a computer device 1200 includes a central processing unit (CPU) 1201, a system memory 1204 including a random access memory 1202 and a read-only memory 1203, and a system bus 1205 connecting the system memory 1204 to the central processing unit 1201. The computer device 1200 further includes a basic input/output system (I/O system) 1206 configured to transmit information between components in the computer, and a mass storage device 1207 configured to store an operating system 1213, an application program 1214, and other program module 1215.

The basic I/O system 1206 includes a display 1208 configured to display information and an input device 1209 such as a mouse or a keyboard that is configured to input information by a user. The display 1208 and the input device 1209 are both connected to the central processing unit 1201 through an input/output controller 1210 connected to the system bus 1205. The basic I/O system 1206 may further include the input/output controller 1210, to receive and process inputs from a plurality of other devices, such as the keyboard, the mouse, or an electronic stylus. Similarly, the input/output controller 1210 further provides an output to a display screen, a printer, or other types of output devices.

The mass storage device 1207 is connected to the central processing unit 1201 by using a mass storage controller (not shown) connected to the system bus 1205. The mass storage device 1207 and an associated computer-readable medium provide non-volatile storage for the computer device 1200. That is, the mass storage device 1207 may include a computer-readable medium (not shown), such as a hard disk or a drive.

Without loss of generality, the computer-readable medium may include a computer storage medium and a communication medium. The computer storage medium includes volatile and non-volatile media, and removable and non-removable media implemented by using any method or technology used for storing information such as computer-readable instructions, data structures, program modules, or other data. The computer storage medium includes a random access memory (RAM), a read only memory (ROM), a flash memory or other solid state storage technologies, a compact disc read-only memory (CD-ROM), a digital versatile disc (DVD) or other optical storage, a magnetic cassette, a magnetic tape, magnetic disk storage or other magnetic storage devices. Certainly, it may be known by a person skilled in the art that the computer storage medium is not limited to the foregoing several types. The system memory 1204 and the mass storage device 1207 may be collectively referred to as a memory.

The memory stores one or more programs, and the one or more programs are configured to be executed by one or more central processing units 1201. The one or more programs include instructions used for implementing the foregoing method, and the central processing unit 1201 executes the one or more programs to implement the method according to the foregoing method embodiments.

According to some embodiments, the computer device 1200 may further be connected, through a network such as the Internet, to a remote computer on the network for running. That is, the computer device 1200 may be connected to a network 1212 by using a network interface unit 1211 connected to the system bus 1205, or may be connected to another type of network or a remote computer system (not shown) by using the network interface unit 1211.

The memory further includes one or more programs. The one or more programs are stored in the memory, and include operations performed by the computer device for implementing the method according to some embodiments.

Some embodiments further provide a computer-readable storage medium, storing at least one instruction, at least one program, a code set, or an instruction set, the at least one instruction, the at least one program, the code set, or the instruction set being loaded and executed by a processor to implement the image classification method according to any of the embodiments.

Some embodiments provide a computer program product or a computer program, the computer program product or the computer program including computer instructions, the computer instructions being stored in a computer-readable storage medium, a processor of a computer device reading the computer instructions from the computer-readable storage medium, the processor executing the computer instructions to cause the computer device to perform the image classification method according to the foregoing aspect.

The information (including but not limited to user device information, user personal information, and the like), data (including but not limited to data used for analysis, stored data, displayed data, and the like) and signals involved are all authorized by the user or fully authorized by the parties, and the collection, use and processing of relevant data need to comply with relevant laws, regulations and standards of relevant countries and regions. For example, information such as the first sample image and the second sample image involved are all obtained under full authorization.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure.

What is claimed is:

1. An image classification method, performed by a computer device, the image classification method comprising:
   performing image segmentation on an unlabeled sample image to obtain image blocks and performing feature extraction on each image block to obtain an initial image feature set comprising an initial image feature corresponding to each image block;
   rearranging and combining the initial image features in the initial image feature set to obtain a first image feature set and a second image feature set, first image features in the first image feature set and second image features in the second image feature set corresponding to different rearrangement and combination manners;
   pre-training an image classification model based on the first image feature set and the second image feature set, the image classification model being configured to classify content in an image; and
   fine-tuning the pre-trained image classification model based on a labeled sample image.

2. The image classification method according to claim 1, wherein the rearranging and combining comprises:
   adjusting a feature order of the initial image features in the initial image feature set to obtain a first initial image feature set having a first order of the initial image features and a second initial image feature set having a second order of the initial image features that is different from the first order;
   rearranging the first initial image feature set to obtain a first feature matrix, and rearranging the second initial image feature set to obtain a second feature matrix;
   performing feature combination on the initial image features in the first feature matrix, and generating the first image feature set based on a feature combination result; and
   performing feature combination on the initial image features in the second feature matrix, and generating the second image feature set based on the feature combination result.

3. The image classification method according to claim 2, wherein the performing feature combination on the initial image features in the first feature matrix comprises:
   selecting n adjacent initial image features in the first feature matrix through a sliding window;
   performing feature combination on the n initial image features in the first feature matrix to obtain a first combined image feature; and
   performing linear mapping on m groups of first combined image features to obtain the first image feature set, the m groups of the first combined image features being obtained by moving the sliding window; and
   the performing feature combination on the initial image features in the second feature matrix comprises:
   selecting n adjacent initial image features in the second feature matrix through the sliding window;
   performing feature combination on the n initial image features in the second feature matrix to obtain a second combined image feature; and
   performing linear mapping on m groups of second combined image features to obtain the second image feature set, the m groups of the second combined image features being obtained by moving the sliding window.

4. The image classification method according to claim 3, wherein the performing feature combination on the n initial image features to obtain the first combined image feature comprises:

performing feature splicing on the n initial image features to obtain the first combined image feature, or performing feature fusion on the n initial image features to obtain the first combined image feature; and wherein the performing feature combination on the n initial image features to obtain the second combined image feature comprises:

performing feature splicing on the n initial image features to obtain the second combined image feature, or performing feature fusion on the n initial image features to obtain the second combined image feature.

5. The image classification method according to claim 2, wherein the rearranging the first initial image feature set comprises:

determining a matrix size based on an image segmentation manner of the first sample image;

rearranging the initial image features in the first initial image feature set based on the matrix size to obtain the first feature matrix; and rearranging the initial image features in the second initial image feature set based on the matrix size to obtain the second feature matrix.

6. The image classification method according to claim 1, wherein after the rearranging and combining, the image classification method comprises:

iteratively performing at least one rearrangement and combination based on the first image feature set to obtain a third image feature set;

iteratively performing at least one rearrangement and combination based on the second image feature set to obtain a fourth image feature set; and pre-training the image classification model based on the third image feature set and the fourth image feature set.

7. The image classification method according to claim 1, wherein the rearranging and combining comprises:

adjusting a feature order of the initial image features in the initial image feature set to obtain a first initial image feature set having a first order of the initial image features and a second initial image feature set having a second order of the initial image features that is different from the first order;

rearranging the first initial image feature set to obtain a first feature matrix, and rearranging the second initial image feature set to obtain a second feature matrix;

performing feature combination on the initial image features in the first feature matrix, and generating the first image feature set based on a feature combination result; and performing feature combination on the initial image features in the second feature matrix, and generating the second image feature set based on the feature combination result;

a rearrangement manner of the initial image features in the first feature matrix being different from that in the second feature matrix, and/or, a feature combination manner of the initial image features in the first image feature set being different from that in the second image feature set.

8. The image classification method according to claim 1, wherein the pre-training comprises:

inputting the first image feature set into an online learning branch of the image classification model to obtain a first classification result;

inputting the second image feature set into a target learning branch of the image classification model to obtain a second classification result;

training the online learning branch based on the first classification result and the second classification result; and updating model parameters of the target learning branch based on model parameters of the trained online learning branch.

9. The image classification method according to claim 8, wherein the training the online learning branch comprises:

determining a similarity loss between the first classification result and the second classification result; and updating the model parameters of the online learning branch by back propagation based on the similarity loss.

10. The image classification method according to claim 8, wherein the updating model parameters of the target learning branch comprises:

performing an exponential moving average (EMA) update on the model parameters of the target learning branch based on the model parameters of the trained online learning branch.

11. The image classification method according to claim 8, wherein the fine-tuning the pre-trained image classification model based on the second sample image comprises:

fine-tuning the model parameters of the target learning branch in the image classification model based on the second sample image.

12. The image classification method according to claim 11, wherein the fine-tuning the model parameters of the target learning branch in the image classification model based on the second sample image comprises:

inputting the second sample image into the target learning branch of the image classification model to obtain a sample classification result; and fine-tuning the model parameters of the target learning branch by back propagation based on the sample classification result and a sample classification label corresponding to the second sample image.

13. The image classification method according to claim 1, wherein the image classification model is a vision transformer (ViT) model.

14. An image classification apparatus, comprising:

at least one memory configured to store program code; and at least one processor configured to read the program code and operate as instructed by the program code, the program code comprising:

image segmentation code configured to cause at least one of the at least one processor to perform image segmentation on an unlabeled sample image to obtain image blocks and perform feature extraction on each image block to obtain an initial image feature set comprising an initial image feature corresponding to each image block;

rearrangement and combination code configured to cause at least one of the at least one processor to rearrange and combine the initial image features in the initial image feature set to obtain a first image feature set and a second image feature set, first image features in the first image feature set and second image features in the second image feature set corresponding to different rearrangement and combination manners;

pre-training code configured to cause at least one of the at least one processor to pre-train an image classification model based on the first image feature set and the second image feature set, the image classification model being configured to classify content in an image; and fine-tuning code configured to cause at least one of the at least one processor to fine-tune the pre-trained image classification model based on a labeled sample image.

15. The image classification apparatus according to claim 14, wherein the rearrangement and combination code is further configured to cause at least one of the at least one processor to:
adjust a feature order of the initial image features in the initial image feature set to obtain a first initial image feature set having a first order of the initial image features and a second initial image feature set having a second order of the initial image features that is different from the first order;
rearrange the first initial image feature set to obtain a first feature matrix, and rearrange the second initial image feature set to obtain a second feature matrix;
perform feature combination on the initial image features in the first feature matrix, and generate the first image feature set based on a feature combination result; and
perform feature combination on the initial image features in the second feature matrix, and generate the second image feature set based on the feature combination result.

16. The image classification apparatus according to claim 15, wherein the rearrangement and combination code is further configured to cause at least one of the at least one processor to:
select n adjacent initial image features in the first feature matrix through a sliding window;
perform feature combination on the n initial image features to obtain a first combined image feature;
perform linear mapping on m groups of first combined image features to obtain the first image feature set, the m groups of the first combined image features being obtained by moving the sliding window;
select n adjacent initial image features in the second feature matrix through the sliding window;
perform feature combination on the n initial image features to obtain a second combined image feature; and
perform linear mapping on m groups of the second combined image features to obtain the second image feature set, the m groups of the second combined image features being obtained by moving the sliding window.

17. The image classification apparatus according to claim 16, wherein the rearrangement and combination code is further configured to cause at least one of the at least one processor to:
perform feature splicing on the n initial image features to obtain the first combined image feature, or perform feature fusion on the n initial image features to obtain the first combined image feature; and
perform feature splicing on the n initial image features to obtain the second combined image feature, or perform feature fusion on the n initial image features to obtain the second combined image feature.

18. A non-transitory computer-readable storage medium, storing computer code that, when executed by at least one processor, causes the at least one processor to at least:
perform image segmentation on an unlabeled sample image to obtain image blocks and performing feature extraction on each image block to obtain an initial image feature set comprising an initial image feature corresponding to each image block;
rearrange and combine the initial image features in the initial image feature set to obtain a first image feature set and a second image feature set, first image features in the first image feature set and second image features in the second image feature set corresponding to different rearrangement and combination manners;
pre-train an image classification model based on the first image feature set and the second image feature set, the image classification model being configured to classify content in an image; and
fine-tune the pre-trained image classification model based on a labeled sample image.

19. The non-transitory computer-readable storage medium according to claim 18, wherein the rearrange and combine comprises:
adjusting a feature order of the initial image features in the initial image feature set to obtain a first initial image feature set having a first order of the initial image features and a second initial image feature set having a second order of the initial image features that is different from the first order;
rearranging the first initial image feature set to obtain a first feature matrix, and rearranging the second initial image feature set to obtain a second feature matrix;
performing feature combination on the initial image features in the first feature matrix, and generating the first image feature set based on a feature combination result; and
performing feature combination on the initial image features in the second feature matrix, and generating the second image feature set based on the feature combination result.

20. The non-transitory computer-readable storage medium according to claim 19, wherein the performing feature combination on the initial image features in the first feature matrix comprises:
selecting n adjacent initial image features in the first feature matrix through a sliding window;
performing feature combination on the n initial image features to obtain a first combined image feature; and
performing linear mapping on m groups of first combined image features to obtain the first image feature set, the m groups of the first combined image features being obtained by moving the sliding window; and
the performing feature combination on the initial image features in the second feature matrix comprises:
selecting n adjacent initial image features in the second feature matrix through the sliding window;
performing feature combination on the n initial image features to obtain a second combined image feature; and
performing linear mapping on m groups of second combined image features to obtain the second image feature set, the m groups of the second combined image features being obtained by moving the sliding window.

* * * * *